United States Patent
Groenewolt et al.

(10) Patent No.: US 9,328,257 B2
(45) Date of Patent: May 3, 2016

(54) COATING COMPOSITION HAVING A HIGH SOLIDS CONTENT AND GOOD LEVELLING AND ALSO MULTILAYER SURFACE COATINGS PRODUCED THEREFROM AND THEIR USE

(75) Inventors: Matthijs Groenewolt, Münster (DE); Jörg Müller, Hamm (DE)

(73) Assignee: BASF COATINGS GMBH, Munster (DE)

( * ) Notice: Subject to any disclaimer, the term of this patent is extended or adjusted under 35 U.S.C. 154(b) by 325 days.

(21) Appl. No.: 13/988,453

(22) PCT Filed: Nov. 14, 2011

(86) PCT No.: PCT/EP2011/070033
§ 371 (c)(1),
(2), (4) Date: Aug. 7, 2013

(87) PCT Pub. No.: WO2012/065942
PCT Pub. Date: May 24, 2012

(65) Prior Publication Data
US 2014/0065313 A1    Mar. 6, 2014

Related U.S. Application Data

(60) Provisional application No. 61/415,357, filed on Nov. 19, 2010.

(30) Foreign Application Priority Data

Nov. 19, 2010  (EP) ..................................... 10191828

(51) Int. Cl.
| | | |
|---|---|---|
| *C08G 18/09* | (2006.01) | |
| *C09D 133/08* | (2006.01) | |
| *C08G 18/10* | (2006.01) | |
| *C08G 18/62* | (2006.01) | |
| *C08G 18/71* | (2006.01) | |
| *C08G 18/77* | (2006.01) | |
| *C08G 18/79* | (2006.01) | |
| *C08G 18/80* | (2006.01) | |
| *C09D 175/04* | (2006.01) | |

(52) U.S. Cl.
CPC .............. *C09D 133/08* (2013.01); *C08G 18/10* (2013.01); *C08G 18/6229* (2013.01); *C08G 18/6254* (2013.01); *C08G 18/718* (2013.01); *C08G 18/778* (2013.01); *C08G 18/798* (2013.01); *C08G 18/809* (2013.01); *C09D 175/04* (2013.01)

(58) Field of Classification Search
CPC .......................... C08G 18/3203; C08G 18/289
See application file for complete search history.

(56) References Cited

U.S. PATENT DOCUMENTS

| | | | |
|---|---|---|---|
| 4,546,046 A | 10/1985 | Etzell et al. | |
| 4,598,131 A | 7/1986 | Prucnal | |
| 4,710,542 A | 12/1987 | Forgione et al. | |
| 5,691,439 A | 11/1997 | Slack et al. | |
| 5,716,678 A | 2/1998 | Rockrath et al. | |
| 5,908,948 A * | 6/1999 | Roesler et al. | 556/421 |
| 2011/0020659 A1 | 1/2011 | Stentrup et al. | |
| 2013/0136865 A1 | 5/2013 | Groenewolt et al. | |

FOREIGN PATENT DOCUMENTS

| | | |
|---|---|---|
| DE | 102005045228 A1 | 4/2007 |
| DE | 102010015683 A1 | 10/2011 |
| EP | 0008127 A1 | 2/1980 |
| EP | 0245700 B1 | 11/1987 |
| EP | 0249201 A2 | 12/1987 |
| EP | 0276501 A2 | 8/1988 |
| EP | 0864575 A2 | 9/1998 |
| EP | 864575 A2 * | 9/1998 |
| EP | 0994117 A1 | 4/2000 |
| EP | 0692007 B1 | 12/2001 |
| EP | 1273640 A2 | 1/2003 |
| EP | 1426393 A2 | 6/2004 |
| JP | 2005042001 | 2/2015 |
| WO | WO9422968 A1 | 10/1994 |
| WO | WO9712945 A1 | 4/1997 |
| WO | WO0109260 A1 | 2/2001 |
| WO | WO0198393 A1 | 12/2001 |
| WO | WO2008074489 A1 | 6/2008 |
| WO | WO2008074490 A1 | 6/2008 |
| WO | WO2008074491 A1 | 6/2008 |
| WO | WO-2009/115294 | 9/2009 |
| WO | WO2010135021 A1 | 11/2010 |

OTHER PUBLICATIONS

Römpp Lexikon "Lacke and Druckfarben," Georg Thieme Verlag, Stuttgart, 1998, pp. 250 to 252.

(Continued)

*Primary Examiner* — Kuo-Liang Peng
(74) *Attorney, Agent, or Firm* — Servilla Whitney LLC

(57) ABSTRACT

Provided is a coating composition comprising
  at least one hydroxyl-containing compound (A), at least one compound (B1) having at least one silane group of the formula (I)

—X—Si—R''$_x$G$_{3-x}$    (I)

with
  G=identical or different hydrolyzable groups,
  X=organic radical, more particularly linear and/or branched alkylene or cycloalkylene radical having 1 to 20 carbon atoms,
  R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
  x=0 to 2, and
  at least one compound (B2) different from the component (B1) and which is prepared from a linear aliphatic diisocyanate (DI), (B2) comprising uretdione groups and at least 2 isocyanate groups per molecule.

15 Claims, No Drawings

(56) References Cited

OTHER PUBLICATIONS

Singh, B. et al., "Carbamylmethylated Melamines, Novel Crosslinkers for the Coatings Industry", Advanced Organic Coatings Science and Technology Series, 1991, vol. 13, pp. 193 to 207.
English Translation of International Search Report for International Application No. PCT/EP2011/070033 mailed Feb. 16, 2012, 2 pages.
Written Opinion for International Application No. PCT/EP2011/070033 mailed Feb. 16, 2012, 5 pages.
English Translation of International Preliminary Report on Patentability for International Application No. PCT/EP2011/070033 issued May 21, 2013, 7 pages.
Partial English Translation of JP-2005-042001 4 pages.

* cited by examiner

COATING COMPOSITION HAVING A HIGH SOLIDS CONTENT AND GOOD LEVELLING AND ALSO MULTILAYER SURFACE COATINGS PRODUCED THEREFROM AND THEIR USE

CROSS REFERENCE TO RELATED APPLICATIONS

This application is a National Phase Application of Patent Application PCT/EP2011/070033 filed on 14 Nov. 2011, which claims priority to U.S. 61/415,357 filed 19 Nov. 2010 and EP10191828.2 filed 19 Nov. 2010, of which all aforementioned applications are incorporated by reference herein in their entirety.

FIELD OF THE INVENTION

The present invention relates to coating compositions based on aprotic solvents and comprising at least one oligomeric and/or polymeric, hydroxyl-containing compound (A) and also at least one compound (B) having silane groups.

BACKGROUND OF THE INVENTION

Coating compositions of this kind are known from WO 08/74491, WO 08/74490, and WO 08/74489, for example. The compound (B) used in these coating compositions and containing isocyanate groups and silane groups is based on known isocyanates, preferably on the biuret dimers and isocyanurate trimers of diisocyanates, more particularly of hexamethylene diisocyanate. These coating compositions have the advantage over conventional polyurethane coating compositions of significantly enhanced scratch resistance in tandem with good weathering stability. The coating compositions described therein are used more particularly in automotive OEM finishing, although their use in automotive refinish is also described. A disadvantageous aspect to these coating compositions, however, is that a reduction in the solvent fraction, in other words an increase in the nonvolatile fraction, of the coating compositions is associated with a deterioration in the flow properties and hence with a significant impairment of the optical quality of the resultant coatings.

Coating compositions used for the automotive refinish segment, however, are affected by statutory emissions guidelines (e.g., German Federal Airborne Pollutants Ordinance 31). The current European directive prescribes for clearcoat systems a VOC ("volatile organic content") of 420 g/l, resulting, depending on the density of the system used, in nonvolatile fractions of around 60% by weight. A problematic aspect in the development of systems having a high nonvolatile fraction is that in general there is an increase in viscosity and hence a reduction in the fluidity of the system, with adverse consequences for the flow and topcoat holdout. To counteract this effect, it is necessary to raise the nonvolatile fraction while maintaining the same viscosity. This is generally achieved by reducing the viscosity of the curing agent and/or of the binder. Doing so, however, often entails a deterioration in physical film formation, and results in longer drying times. Especially for coating compositions which are used in the automotive refinish segment, this condition is disadvantageous, since the coating compositions used in the refinish segment offer long reaction times in any case.

U.S. Pat. No. 5,691,439 discloses coating compositions which, in addition to hydroxyl-containing binders (A), comprise compounds (B) with isocyanate groups as crosslinkers, it being essential to the invention that the compounds (B) also have silane groups or siloxane groups, in order to lower the surface energy, and also have allophanate groups, in order to obtain transparent coatings, meaning that coatings are obtained which have improved surface properties. That specification, however, lacks details as to how the solvent fraction of the coating compositions can be lowered while nevertheless ensuring high cure rates even under the conditions of automotive refinish.

Furthermore, EP-A-1 273 640 describes 2K [2-component] coating compositions, comprising a polyol component and a crosslinker component, consisting of aliphatic and/or cycloaliphatic polyisocyanates or the polyisocyanates derived from them by polymerization, allophanatization, biuretization or urethanization, with 0.1 to 95 mol % of the originally free isocyanate groups present having undergone reaction with bisalkoxysilylamine. These coating compositions can be used for producing clearcoats or topcoats in the automotive segment and, when they have fully cured, exhibit high scratch resistance in conjunction with high resistance to environmental influences. That specification, however, lacks details as to how the solvent fraction of the coating compositions can be lowered while still ensuring high cure rates, even under the conditions of automotive refinish, and without detraction from the surface properties of the resultant coatings.

WO 2001/98393 describes 2K [2-component] coating compositions comprising a polyol as binder component and, as crosslinker component, a mixture of a polyisocyanate (A) and a silane oligomer (B) which contains at least two isocyanate groups and additionally alkoxysilane groups, preferably bisalkoxysilane groups, and which is prepared by reaction of a polyisocyanate (PI) with alkoxysilylamines, preferably with bisalkoxysilylamines, more particularly with bis(3-propyltrimethoxy-silyl)amine. As polyisocyanate (A) and also as polyisocyanate (PI) for preparing the component (B) it is preferred to use hexamethylene diisocyanate and also the biurets and isocyanurates thereof. These coating compositions are employed particularly as primers and are optimized for adhesion to metallic substrates, preferably to aluminum substrates.

In addition, EP-A-1 426 393 discloses polyisocyanates which contain uretdione groups, are of low monomer content, and have the advantage, moreover, that their stability with respect to retrograde cleavage is improved over that of the uretdiones formerly used. This improved stability with respect to retrograde cleavage is acquired by dimerizing the uretdiones at temperatures of <=40° C. in the presence of trialkylphosphines and then separating off the trialkylphosphines. The uretdiones are used, for example, as curing agents in coating compositions. That specification, however, lacks details of how the surface properties of the resultant coatings can be influenced, and details as to how effective curing can be ensured even under the conditions of refinish.

In the as yet unpublished international patent application PCT/US 2010/028308, coating compositions are described which in addition to a hydroxyl-group-containing component (A) and an isocyanate-group-containing component (B) comprise the reaction product of a uretdione with a bisalkoxysilylamine or a monoalkoxysilylamine, the reaction product of uretdione with the alkoxy silylamine no longer having any residual isocyanate groups.

EP-B-864 575 describes compounds with alkoxysilane and urea groups which are obtained by reaction of polyisocyanates, such as uretdiones and/or isocyanurates, for example, with secondary monoalkoxysilylamines containing ester groups, such as, more particularly, diethyl N-(3-trimethoxysilylpropyl)-aspartate. The compounds with alkoxysilane and urea groups substantially have no residual isocyanate groups, and are used, according to EP-B-864 575, optionally together with further components, containing silane groups, in coating compositions which cure exclusively by way of silane polycondensation. The use of these compounds with alkoxysilane and urea groups together with hydroxyl-group-containing components and isocyanate-group-containing components, on the other hand, is not described in EP-B-864 575.

Finally, the as yet unpublished German patent application DE 10 2010 015 683.3-43 describes coating compositions which in addition to a polyol component comprise polyisocyanates containing uretdione groups, in which some of the isocyanate groups are functionalized with alkoxysilylamines, preferably with bisalkoxysilylamines. Coating compositions based on a mixture of preferably nonfunctionalized uretdione-group-containing polyisocyanates with isocyanurate-group-containing silanized polyisocyanates are not described in this document.

The problem addressed by the present invention, therefore, was that of providing coating compositions, more particularly for automotive refinish, which ensure effective curing even under refinish conditions, have a high solids content and hence a very low solvent content, exhibit good flow and topcoat holdout, and lead to coatings having good surface properties and good intercoat adhesion. The intercoat adhesion was assessed in this case using the cross-cut test in accordance with DIN 2409.

The overall optical appearance was assessed by measuring the surface profile of the applied and baked coating films, using the wavescan method, which allows measurement of the visible profile of coating film surfaces. For this purpose, the intensity of reflection ("waviness") was measured by means of the Byk-Gardner Wave Scan instrument, recording 1250 measurement points over a distance of 10 cm. The instrument divides the reflection into longwavedness ("long-wave"), i.e., the variance in light intensity for structures in the range from 0.6 mm to 10 mm, and into shortwavedness ("short-wave"), i.e., the variance in light intensity for structures in the range from 0.1 mm to 0.6 mm. For a good appearance, low long-wave measurement values in the resultant coatings, for very low film thicknesses, are particularly critical.

Furthermore, the intention was to provide coating compositions which lead to a highly weathering-stable network and which at the same time ensure high acid resistance. In addition, the intention was that the coating compositions should lead to coatings which are highly scratch-resistant and more particularly exhibit a high level of gloss retention after scratch exposure. Moreover, the coatings and paint finishes, especially the clearcoats, ought to be able to be produced even in film thicknesses >40 μm without stress cracks occurring. Furthermore, the coating compositions ought to meet the requirements typically imposed on the clearcoat film in automotive OEM finishes and automotive refinishes.

Finally, the new coating compositions ought to be producible easily and with very good reproducibility, and ought not to cause any environmental problems in the course of paint application.

SUMMARY OF THE INVENTION

In light of the above-identified problem statement, coating compositions have been found that are based on aprotic solvents, comprising at least one oligomeric and/or polymeric, hydroxyl-containing compound (A), at least one compound (B1) having at least one silane group of the formula (I)

$$-X-Si-R''_xG_{3-x} \qquad (I)$$

with

G=identical or different hydrolyzable groups, particularly G=alkoxy group (OR'), R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl, X=organic radical, more particularly linear and/or branched alkylene or cycloalkylene radical having 1 to 20 carbon atoms, very preferably X=alkylene radical having 1 to 4 carbon atoms, R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R''=alkyl radical, more particularly having 1 to 6 C atoms, x=0 to 2, preferably 0 to 1, more preferably x=0 and at least one compound (B2) which is different from the component (B1) and has at least 2 isocyanate groups per molecule, wherein (i) the compound (B2) contains uretdione groups, and (ii) the compound (B2) has been prepared from a linear aliphatic diisocyanate (DI).

The present invention additionally provides multistage coating methods using these coating compositions, and the use of the coating compositions as clearcoat, and application of the coating method for the coating of components for installation in or on automobiles, and/or of plastics substrates and for automotive refinish.

In light of the prior art it was surprising and unforeseeable for the skilled worker that the problems addressed by the present invention could be solved with the aid of the coating compositions of the invention.

Hence it is surprising in particular that the coating compositions of the invention exhibit effective curing even under refinish conditions, have a high solids content and hence a very low solvent content, exhibit good flow and topcoat holdout, and lead to coatings having good surface properties and good intercoat adhesion. The resultant coatings, accordingly, have the low long-wave measurement values at very low film thicknesses that are important particularly for a good appearance.

Furthermore, the coating compositions result in a highly weathering-stable network and at the same time ensure high acid resistance. In addition, the coating compositions give coatings which are highly scratch-resistant and more particularly exhibit a high level of gloss retention after scratch exposure. Moreover, the coatings and paint finishes, especially the clearcoats, can be produced even at film thicknesses >40 μm without stress cracks occurring. Over and above these qualities, the coating compositions meet the requirements typically imposed on the clearcoat film in automotive OEM finishes and automotive refinishes.

Lastly, the new coating compositions can be produced easily and very reproducibly, and do not give rise to any environmental problems during paint application.

DESCRIPTION OF AN EMBODIMENT THE INVENTION

The Coating Compositions of the Invention

The coating compositions of the invention are, more particularly, thermally curable coating compositions, i.e., preferably, coating compositions which are substantially free from radiation-curable unsaturated compounds, being more particularly completely free from radiation-curable unsaturated compounds.

The Silane-Group-Containing Compound (B1) and the Isocyanate-Group-Containing Compounds (B2)

As crosslinking agents the coating compositions of the invention comprise a mixture of (a) one or more compounds (B1) having at least one silane group and optionally having free, i.e., unblocked, and/or blocked isocyanate groups and (β) one or more compounds (B2) having at least two free, i.e., unblocked, and/or blocked isocyanate groups. The coating compositions of the invention preferably comprise compounds (B2) having free isocyanate groups and—if (B1) still contains isocyanate groups—compounds (B1) having free isocyanate groups.

In the case of one-component coating compositions, isocyanate-group-containing compounds (B2) and—if (B1) still contains isocyanate groups—compounds (B1) are selected whose free isocyanate groups are blocked with the usual blocking agents. The isocyanate groups may be blocked, for example, with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. It is especially preferred for the isocyanate groups of components (B1) and (B2) to be blocked with 3,5-dimethylpyrazole.

The compound used as component (B1) in the coating composition comprises at least one silane group of the formula (I)

with
G=identical or different hydrolyzable groups, particularly G=alkoxy group (OR'),
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X=organic radical, more particularly linear and/or branched alkylene or cycloalkylene radical having 1 to 20 carbon atoms, very preferably X=alkylene radical having 1 to 4 carbon atoms,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms,
x=0 to 2, preferably 0 to 1, more preferably x=0.

The compound used as component (B1) in the coating composition may, in addition to the silane groups, also have free and/or blocked isocyanate groups. Preferably, however, the component (B1) used in the coating composition is substantially isocyanate-group-free.

Suitable for preparing the component (B1) are conventional substituted or unsubstituted aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Preferred polyisocyanates are also the biuret dimers and the isocyanurate trimers of the aforementioned diisocyanates. Particularly preferred polyisocyanates PI are hexamethylene 1,6-diisocyanate, isophorone diisocyanate and 4,4'-methylenedicyclohexyl diisocyanate, the biuret dimers and/or isocyanurate trimers thereof.

With particular preference the coating composition comprises at least one isocyanate-group-containing compound (B1) which in addition to the silane groups also contains isocyanurate groups and/or allophanate groups.

In another embodiment of the invention, the polyisocyanates are polyisocyanate prepolymers with urethane structural units, which are obtained by reacting polyols with a stoichiometric excess of aforementioned polyisocyanates. Polyisocyanate prepolymers of this kind are described in U.S. Pat. No. 4,598,131, for example.

Particularly preferably the coating composition comprises at least one compound (B1) which has
between 0 and 100 mol %, based on the entirety of structural units (II) and (III), at least one structural unit of the formula (II)

and
between 0 and 100 mol %, based on the entirety of structural units (II) and (III), at least one structural unit of the formula (III)

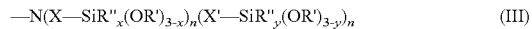

where
R=hydrogen, alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
X, X'=linear and/or branched alkylene or cycloalkylene radical having 1 to 20 carbon atoms, preferably X, X'=alkylene radical having 1 to 4 carbon atoms,
n=0 to 2, m=0 to 2, m+n=2, and x, y=0 to 2 and R' and R" have the meaning given in formula (I).

The respective preferred alkoxy radicals (OR') may be alike or different, what is critical for the construction of the radicals, however, is to what extent they influence the reactivity of the hydrolyzable silane groups. Preferably R' is an alkyl radical, more particularly having 1 to 6 C atoms. Particularly preferred radicals R' are those which increase the reactivity of the silane groups, i.e., which represent good leaving groups. In this sense, a methoxy radical is preferred over an ethoxy radical, which in turn is preferred over a propoxy radical. With particular preference, therefore, R'=ethyl and/or methyl, more particularly methyl.

The reactivity of organofunctional silanes may also be influenced considerably, furthermore, by the length of the spacers X, X' between silane functionality and organic functional group serving for reaction with the modifying constituent. By way of example of this, mention may be made of the "alpha" silanes, which are available from the company Wacker, and in which there is a methylene group, rather than the propylene group present in the case of "gamma" silanes, between Si atom and functional group.

The compounds (B1) preferably used in accordance with the invention and functionalized with the structural units (II) and (III) are obtained more preferably by reaction of di- and/or polyisocyanates (PI) with at least one compound of the formula (IIa)

$$H-NR-(X-SiR''_x(OR')_{3-x}) \quad (IIa),$$

and with at least one compound of the formula (IIIa)

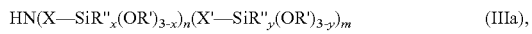

$$HN(X-SiR''_x(OR')_{3-x})_n(X'-SiR''_y(OR')_{3-y})_m \quad (IIIa),$$

the substituents being as defined above.

Inventively preferred compounds (IIIa) are bis(2-ethyltrimethoxysilyl)amine, bis(3-propyltrimethoxy-silyl)amine, bis(4-butyltrimethoxysilyl)amine, bis(2-ethyltriethoxysilyl)amine, bis(3-propyltriethoxysilyl)-amine and/or bis(4-butyltriethoxysilyl)amine. Especially preferred is bis(3-propyltrimethoxysilyl)-amine. Aminosilanes of this kind are available, for example, under the brand name Dynasylan® from Degussa or Silquest® from OSI.

Inventively preferred compounds (IIa) are aminoalkyltrialkoxysilanes, such as, preferably, 2-aminoethyltrimethoxysilane, 2-aminoethyltriethoxy-silane, 3-aminopropyltrimethoxysilane, 3-aminopropyl-triethoxysilane, 4-aminobutyltrimethoxysilane, 4-amino-butyltriethoxysilane. Particularly preferred compounds (Ia) are N-(2-(trimethoxysilyl)ethyl)alkylamines, N-(3-(trimethoxysilyl)propyl)alkylamines, N-(4-(tri-methoxysilyl)butyl)alkylamines, N-(2-(triethoxysilyl)-ethyl)alkylamines, N-(3-(triethoxysilyl)propyl)-alkylamines and/or N-(4-(triethoxysilyl)butyl) alkylamines. Especially preferred is N-(3-(trimethoxysilyl)-propyl)butylamine. Aminosilanes of this kind are available, for example, under the brand name Dynasylan® from Degussa or Silquest® from OSI.

It is preferred for the isocyanate-group-containing compound (B1) to have from 0 to 100 mol %, more preferably 5 to 70 mol %, and very particularly preferably 10 to 50 mol %, of at least one monosilane structural unit (II) of the formula (II), and also 0 to 100 mol %, more preferably 30 to 95 mol %, and very particularly preferably 50 to 90 mol %, of at least one bissilane structural unit (III) of the formula (III), based in each case on the entirety of the structural units (II) and (III).

It is particularly preferred, in the component (B1), for the total fraction of the isocyanate groups that are reacted to form the structural units (II) and/or (III) to be between 10 and 100 mol %, preferably between 30 and 100 mol %, and more preferably between 50 and 100 mol %.

For a given solids content, in fact, component (B1) generally has a higher viscosity than component (B2). It is therefore desirable to minimize the fraction of component (B1) while maximizing the fraction of component (B2). In order nevertheless to ensure a sufficiently high silane functionality in the coating composition via the component (B1), therefore, the fraction of the silane groups in the component (B1) must be maximized, and the fraction of residual, unreacted isocyanate groups minimized.

Especially preferred isocyanate-group-containing compounds (B1) are reaction products of hexamethylene 1,6-diisocyanate and/or isophorone diisocyanate and/or 4,4'-methylenedicyclohexyl diisocyanate and/or the isocyanurate trimers thereof with bis(3-propyl-trimethoxysilyl)amine and optionally N-(3-(trimethoxy-silyl)propyl)butylamine.

The solids content of the polyisocyanate component (B1) used in accordance with the invention is advantageously more than 60% by weight, preferably at least 62% by weight.

The compound used as component (B2) in the coating composition having at least two free, i.e., unblocked, and/or blocked isocyanate groups per molecule has been prepared from at least one linear aliphatic diisocyanate (DI). This ensures that the resultant compounds (B2) can be used in the form of high-solids solutions having a solids content of more than 70% by weight, more particularly at least 75% by weight, in the coating compositions of the invention, while at the same time producing coatings whose surface properties, such as the flow in particular, are very good.

The isocyanate-group-containing compound used as component (B2) in the coating composition has preferably been prepared from at least one linear aliphatic diisocyanate (DI) having 3 to 12 C atoms, more particularly having 4 to 10 C atoms, and especially having 5 to 6 C atoms.

Examples of the linear aliphatic diisocyanates (DI) suitable for preparing component (B2) are butane diisocyanate, pentane diisocyanate, hexane diisocyanate, heptane diisocyanate, octane diisocyanate, nonane diisocyanate, decane diisocyanate, undecane diisocyanate, dodecane diisocyanate, and, more particularly, hexane diisocyanate.

Furthermore, it is essential to the invention that the isocyanate-group-containing compound (B2) contains uretdione groups as well as the free and/or blocked isocyanate groups. As a result of this use of isocyanate-group-containing compounds having uretdione groups, in contrast to the use of isocyanurates and in contrast to the use of biurets and/or allophanates of the same diisocyanates, coatings are obtained that have substantially better surface properties, more particularly having lower long-wave values. The long-wave values of the applied and baked coating films are measured by means of the wavescan method, which allows measurement of the visible profile of coating film surfaces. For this purpose, the intensity of reflection ("waviness") was measured by means of the Byk-Gardner Wave Scan instrument, recording 1250 measurement points over a distance of 10 cm. The instrument divides the reflection into longwavedness ("long-wave"), i.e., the variance in light intensity for structures in the range from 0.6 mm to 10 mm, and into shortwavedness ("short-wave"), i.e., the variance in light intensity for structures in the range from 0.1 mm to 0.6 mm.

Preferably, the compound (B2) has a uretdione group content >50 mol %, preferably more than 50 to 90 mol %, more preferably 65 to 80 mol %, based in each case on the entirety of the structural types formed by isocyanate oligomerization of the linear aliphatic diisocyanate (DI). Uretdiones suitable as component (B2) are also described, for example, in EP-A-1 426 393, page 2, paragraph [0012], to page 4, paragraph [0030]. It is known that commercial uretdiones may contain 5% to 30% by weight of the corresponding isocyanurate of the diisocyanate in question, based in each case on the total weight of the commercial product. This isocyanurate fraction is not necessarily preferred, but generally also causes no problems either in the coating compositions of the invention. These isocyanurates introduced via the uretdiones into the coating composition are then to be assigned, formally, not to the uretdione-group-containing component (B2), but instead to the above-described component (B1).

It is preferred for less than 5 mol %, preferably less than 2.5 mol %, and more preferably none of the isocyanate groups in the uretdione-group-containing compound (B2) to have undergone reaction to form structural units (I), (II) and/or (III).

The solids content of the polyisocyanate component (B2) used in accordance with the invention is advantageously more than 70% by weight, preferably at least 75% by weight.

Preferred in accordance with the invention are coating compositions wherein the proportion of the uretdione-group-containing component (B2) to the silane-group-containing component (B1) is between 0.5 equivalent of component (B2) to 1.0 equivalent of component (B1) and 50.0 equivalents of component (B2) to 1.0 equivalent of component (B1), preferably between 0.8 equivalent of component (B2) to 1.0 equivalent of component (B1) and 20.0 equivalents of component (B2) to 1.0 equivalent of component (B1).

The equivalents of the compound (B1) and (B2), respectively, are determined in the customary way by dividing the amount of (B1) or (B2) used, in grams, by the equivalent weight of the compound (B1) or (B2), in grams. In calculating the proportion in equivalents, for the purpose of simplification, any fraction of isocyanurate-group-containing compounds that may be present in commercial, uretdione-group-containing compounds (B2) is assigned to component (B2); in other words, in the calculation set out below, an idealized compound (B2) is assumed, especially since the fraction of isocyanurate-group-containing compound in (B2), which is small at most—if present at all—would have only an extremely small effect on the equivalent ratio.

To determine the equivalent weight of the compound (B1), first of all the equivalent weight EEW of the silane-group-free compound (B1) is determined arithmetically in grams, in a known way, from the isocyanate group content in % by weight as measured in accordance with DIN EN ISO 3219/A.3:

$$EEW(B1 \text{ nonsilanized}) = 100\% \text{ by weight} * 42 \text{ g}/\text{isocyanate content in \% by weight}$$

The equivalent weight EEW of the silanized compound (B1) in grams is likewise determined arithmetically by means of the above-described equivalent weight EEW of the nonsilanized compound (B1), the fraction of silanized isocyanate groups c, the fraction of silane units (I) as1, the fraction of silane units (II) as2, the fraction of silane units (III) as3, and the theoretical equivalent weights of the silane units (I), (II), and (III) as follows:

$$EEW(B1 \text{ silanized}) = EEW(B1, \text{nonsilanized}) + c * [(as1*EEW(I)) + (as2*EEW(II) + (as3*EEW(III))]$$

where c=degree of conversion of the isocyanate groups originally present in B1 to silane units of the formulae (I)+(II)+(III) in mol %, divided by 100 mol % as1=fraction of isocyanate groups in B1 reacted to form structural units (I), in mol %, divided by 100 mol %, with the proviso that the sum of the structural units (I)+(II)+(III) is always 100 mol % as2=fraction of isocyanate groups in B1 reacted to form structural units (II), in mol %, divided by 100 mol %, with the proviso that the sum of the structural units (I)+(II)+(III) is always 100 mol % as3=fraction of isocyanate groups in B1 reacted to form structural units (III), in mol %, divided by 100 mol %, with the proviso that the sum of the structural units (I)+(II)+(III) is always 100 mol %

EEW (I)=equivalent weight, determined arithmetically from the structural formula, of the structural unit (I): —X—Si—R''$_x$G$_{3-x}$, where X, R'', G, and x are as defined above for formula (I)

EEW (II)=equivalent weight, determined arithmetically from the structural formula, of the structural unit (II): —NR—(X—SiR''x(OR')3-x), where X, R, R'', R', and x are as defined above for formula (II)

EEW(III)=equivalent weight, determined arithmetically from the structural formula, of the structural unit (III): —N(X—SiR''x(OR')3-x)n(X'—SiR''y(OR')3-y)m, where X, R'', R', and x are as defined above for formula (III).

To determine the equivalent weight of the compound (B2), in turn, first of all the equivalent weight EEW of the silane-group-free compound (B2), in grams, is determined arithmetically in a known way, from the isocyanate group content in % by weight, which is measured in accordance with DIN EN ISO 3219/A.3:

$$EEW(B2 \text{ nonsilanized}) = (100\% \text{ by weight} * 42 \text{ g})/\text{isocyanate content in \% by weight}$$

If component (B2) contains silane groups, the equivalent weight EEW of the silanized compound (B2) in grams is likewise determined arithmetically by means of the above-described equivalent weight EEW of the nonsilanized compound (B2), the fraction of silanized isocyanate groups c', the fraction of silane units (I) as'1, the fraction of silane units (II) as'2, the fraction of silane units (III) as'3, and the theoretical equivalent weights of the silane units (I), (II), and (III) as follows:

$$EEW(B2 \text{ silanized}) = EEW(B2, \text{nonsilanized}) + c'* [(as'1*EEW(I)) + (as'2*EEW(II) + (as'3*EEW(III))]$$

where c'=degree of conversion of the isocyanate groups originally present in (B2) to silane units of the formulae (I)+(II)+(III) in mol %, divided by 100 mol % as'1=fraction of isocyanate groups in B2 reacted to form structural units (I), in mol %, divided by 100 mol %, with the proviso that the sum of the structural units (I)+(II)+(III) is always 100 mol % as'2=fraction of isocyanate groups in B2 reacted to form structural units (II), in mol %, divided by 100 mol %, with the proviso that the sum of the structural units (I)+(II)+(III) is always 100 mol % as'3=fraction of isocyanate groups in B2 reacted to form structural units (III), in mol %, divided by 100 mol %, with the proviso that the sum of the structural units (I)+(II)+(III) is always 100 mol %

The Hydroxyl-Containing Compound (A)

As hydroxyl-containing compound (A), use is made of at least one oligomeric and/or polymeric polyol.

The preferred oligomeric and/or polymeric polyols (A) have mass-average molecular weights Mw>500 daltons, as measured by means of gel permeation chromatography (GPC) against a polystyrene standard, preferably of between 800 and 100 000 daltons, more particularly between 1000 and 50 000 daltons.

Particular preference is given to polyester polyols, polyurethane polyols, polysiloxane polyols, polyacrylate polyols and/or polymethacrylate polyols, and also their copolymers, referred to below as polyacrylate polyols.

The polyols preferably have an OH number of 30 to 400 mg KOH/g, more particularly between 100 and 300 KOH/g. The hydroxyl number (OH number) indicates how many mg of potassium hydroxide are equivalent to the amount of acetic acid bound by 1 g of substance on acetylation. It is determined by boiling the sample with acetic anhydride-pyridine and titrating the resultant acid against potassium hydroxide solution (DIN 53240-2).

The glass transition temperatures as measured by DSC in accordance with DIN-EN-ISO 11357-2 for the polyols are preferably between −150 and 100° C., more preferably between −120° C. and 80° C.

Suitable polyester polyols are described in EP-A-0 994 117 and EP-A-1 273 640, for example. Polyurethane polyols are prepared preferably by reaction of polyester polyol prepolymers with suitable diisocyanates or polyisocyanates, and are described in EP-A-1 273 640, for example. Suitable polysiloxane polyols are described in WO-A-01/09260, for example, it being possible for the polysiloxane polyols cited therein to be employed preferably in combination with other polyols, more particularly those having higher glass transition temperatures.

The poly(meth)acrylate polyols that are especially preferred in accordance with the invention are generally copolymers and preferably have mass-average molecular weights Mw of between 1000 and 20 000 daltons, more particularly between 1500 and 10 000 daltons, in each case as measured by gel permeation chromatography (GPC) against a polystyrene standard.

The glass transition temperature of the copolymers is generally between −100 and 100° C., more particularly between −50 and 80° C. (as measured by DSC in accordance with DIN-EN-ISO 11357-2).

The poly(meth)acrylate polyols preferably have an OH number of 60 to 250 mg KOH/g, more particularly between 70 and 200 KOH/g, and an acid number of between 0 and 30 mg KOH/g.

The hydroxyl number (OH number) indicates how many mg of potassium hydroxide are equivalent to the amount of acetic acid bound by 1 g of substance on acetylation. It is determined by boiling the sample with acetic anhydride-pyridine and titrating the resultant acid against potassium hydroxide solution (DIN 53240-2). The acid number here indicates the number of mg of potassium hydroxide consumed in neutralizing 1 g of the respective compound (DIN EN ISO 2114).

As hydroxyl-containing monomer units it is preferred to use hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, more particularly, 4-hydroxybutyl acrylate and/or 4-hydroxybutyl methacrylate.

As further monomer units for the poly(meth)acrylate polyols it is preferred to use alkyl methacrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

As further monomer units for the poly(meth)acrylate polyols it is possible to use vinylaromatic hydrocarbons, such as vinyltoluene, alpha-methylstyrene or, in particular, styrene, amides or nitriles of acrylic acid or methacrylic acid, vinyl esters or vinyl ethers, and also, in minor amounts, in particular, acrylic acid and/or methacrylic acid.

For further increasing the solids content of the coating compositions of the invention and further improving the surface quality (lower long-wave values), particularly in the case of a relatively low degree of silanization of the compound (B), use is made more particularly of lactone-modified, hydroxyl-containing, oligomeric and/or polymeric compounds (A). Particular preference is given to using ε-caprolactone-modified, hydroxyl-containing, oligomeric and/or polymeric compounds (A), and very particular preference to using ε-caprolactone-modified, hydroxyl-containing, polyacrylate polyols and/or ε-caprolactone-modified, hydroxyl-containing polymethacrylate polyols.

The lactone-modified, especially ε-caprolactone-modified, hydroxyl-containing, oligomeric and/or polymeric compounds (A) can be prepared in a manner known to the skilled worker by first preparing the hydroxyl-containing oligomeric and/or polymeric compounds and then reacting them with lactone or with ε-caprolactone. An alternative option is first to subject a portion of the monomeric synthesis components, more particularly a portion of the hydroxyl-containing monomeric synthesis components, to reaction with the lactone, or with ε-caprolactone, and then to construct the lactone-modified or ε-caprolactone-modified oligomer or polymer. Hydroxyl-containing compounds (A) modified with lactone, or with ε-caprolactone, are also described in, for example, U.S. Pat. No. 4,546,046, column 4 line 24 to column 7 line 6.

In another embodiment of the invention the hydroxyl-containing compound A may also contain silane groups (I) as well as the hydroxyl groups.

The Combination of Components (A) and (B), and Further Components of the Coating Composition The weight fractions of the polyol (A) and of the mixture of the silanized polyisocyanate (B1) plus the uretdione-group-containing polyisocyanate (B2) are preferably selected such that the molar equivalent ratio of the unreacted isocyanate groups of the isocyanate-containing compounds (B1) plus (B2) to the hydroxyl groups of the hydroxyl-containing compounds (A) is between 0.8:1 and 1:1.2, preferably between 0.9:1 and 1.1:1, more preferably between 0.95:1 and 1.05:1.

It is preferred in accordance with the invention to use coating compositions which comprise from 5% to 95% by weight, preferably from 20% to 70% by weight, based in each case on the solids content of the coating composition, of at least one hydroxyl-containing polyacrylate (A) and/or of at least one hydroxyl-containing polymethacrylate (A).

It is likewise preferred in accordance with the invention to use coating compositions which comprise from 5% to 95% by weight, preferably from 30% to 80% by weight, based in each case on the solids content of the coating composition, of the mixture of the isocyanate-group-containing compound (B1) plus the isocyanate-group-containing compound (B2).

In the case of one-component coating compositions, the isocyanate-group-containing compounds (B1) and (B2) selected are those whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. With particular preference the isocyanate groups of components (B1) and (B2) are blocked with 3,5-dimethylpyrazole.

In the case of the inventively preferred 2-component (2K) coating compositions, a film-forming component comprising the hydroxyl-containing compound (A) and also further components, described below, is mixed, shortly before the coating composition is applied, with a further film-forming component, comprising the isocyanate-group-containing compounds (B1) and (B2) and, optionally, other of the components described below, mixing taking place in a conventional way, with—generally speaking—the film-forming component which comprises the compound (A) comprising the catalyst and also a portion of the solvent.

If desired, in addition to the hydroxyl-containing component (A), the coating compositions of the invention may comprise one or more hydroxyl-containing compounds (C), which are different from component (A). Preferably these compounds (C) account for a fraction of 10% to 50% by weight, more preferably from 20% to 40% by weight, based on the nonvolatile fraction of the polyol component (A)+(C).

As hydroxyl-containing compound (C) use is made not only of low molecular mass polyols but also of oligomeric and/or polymeric polyols different from component (A).

Low molecular mass polyols used are, for example, diols, such as, preferably, ethylene glycol, neopentylglycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as, preferably, trimethylolethane, trimethylolpropane, trimethylolhexane, 1,2,4-butanetriol, pentaerythritol, and dipentaerythritol.

Low molecular mass polyols of this kind are preferably admixed in minor proportions to the polyol component (A).

Oligomeric and/or polymeric polyols (C) used are, for example, polyester polyols, polyurethane polyols, and polysiloxane polyols, when component (A) is composed exclusively of polyacrylate polyols and/or polymethacrylate polyols.

Catalyst (D)

The coating compositions of the invention preferably comprise at least one catalyst (D) for the crosslinking of the silane groups. Examples are metal complexes with chelate ligands based on zinc or aluminum, such as the titanates or Lewis acids described in WO 05/03340, for example; when selecting the catalysts, however, care should be taken to ensure that the catalysts do not lead to yellowing of the coating compositions. Moreover, a number of catalysts known to be used are less desirable, on toxicological grounds.

It is therefore preferred as catalyst (D) to use phosphorus-containing catalysts, more particularly phosphorus-containing and nitrogen-containing catalysts. In this context use may also be made of mixtures of two or more different catalysts (D).

Examples of suitable phosphorus-containing catalysts (D) are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described in German patent application DE-A-102005045228, for example.

Used more particularly, however, are substituted phosphoric monoesters and phosphoric diesters, preferably from the group consisting of acyclic phosphoric diesters and cyclic phosphoric diesters, more preferably amine adducts of the phosphoric monoesters and diesters.

Very particular preference is given to using, as catalyst (D), the corresponding amine-blocked phosphoric esters, and of these, more particularly, amine-blocked phosphoric acid ethylhexyl esters and amine-blocked phosphoric acid phenyl esters—with especial preference, amine-blocked phosphoric acid bis(2-ethylhexyl) esters.

Particular examples of amines with which the phosphoric esters are blocked include tertiary amines, examples being bicyclic amines, such as, for example, diazabicyclooctane (DABCO), diazabicyclononene (DBN), diazabicycloundecene (DBU), dimethyldodecylamine or triethylamine. Particularly preferred for the blocking of the phosphoric esters are tertiary amines, which ensure high activity of the catalyst under the curing conditions of 140° C.

Particular phosphoric acid catalysts blocked with amine are also available commercially (e.g., Nacure products from King Industries). For example, mention may be made of Nacure 4167 from King Industries, as a particularly suitable catalyst on the basis of an amine-blocked partial ester of phosphoric acid.

The catalysts are used preferably in fractions of 0.01% to 20%, more preferably in fractions of 0.1% to 10%, by weight, based on the nonvolatile constituents of the coating composition of the invention. Lower activity on the part of the catalyst can be partially compensated by correspondingly higher quantities employed.

The coating compositions of the invention may further comprise another amine catalyst based on a bicyclic amine, more particularly on an unsaturated bicyclic amine. Examples of suitable amine catalysts are 1,5-diazabicyclo[4.3.0]non-5-ene or 1,8-diazabicyclo-[5.4.0]undec-7-ene.

These amine catalysts are used preferably in fractions of 0.01% to 20%, more preferably in fractions of 0.1% to 10%, by weight, based on the nonvolatile constituents of the coating composition of the invention.

Suitable solvents for the coating compositions of the invention are more particularly those which within the coating composition are chemically inert toward the compounds (A), (B), and, where used, (C), and which also do not react with (A) and (B) during the curing of the coating composition. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1% by weight, more preferably not more than 0.5% by weight, based on the solvent.

Besides the compounds (A), (B), and, where used, (C) it is also possible to use further binders (E) as well, which are preferably able to react with the hydroxyl groups of the poly(meth)acrylate (A) and/or with the free isocyanate groups of the compound (B) and/or with the alkoxysilyl groups of the compounds (B) and/or (C) and to form network nodes.

As component (E) it is possible, for example, to use amino resins and/or epoxy resins. Suitable amino resins include the customary and known amino resins, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, Volume 13, pages 193 to 207.

Generally speaking, such components (E) are used in fractions of up to 40%, preferably of up to 30%, more preferably of up to 25%, by weight, based on the nonvolatile constituents of the coating composition.

Furthermore, the binder mixture of the invention or the coating composition of the invention may comprise at least one customary and known coatings additive (F) in effective amounts, i.e., in amounts preferably up to 30%, more preferably up to 25%, and more particularly up to 20%, by weight, based in each case on the nonvolatile constituents of the coating composition.

Examples of suitable coatings additives (F) are as follows:
in particular, UV absorbers;
in particular, light stabilizers such as HALS compounds, benzotriazoles or oxalanilides;
free-radical scavengers;
slip additives;
polymerization inhibitors;
defoamers;
reactive diluents, of the kind which are general knowledge from the prior art, and which are preferably inert toward the —Si(OR)$_3$ groups;
wetting agents such as siloxanes, fluorine compounds, carboxylic monoesters, phosphoric esters, polyacrylic acids and copolymers thereof or polyurethanes;
adhesion promoters such as tricyclodecane-dimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben", Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, of the kind disclosed, for example, in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils®; or synthetic polymers containing ionic and/or associative groups, such as polyvinyl alcohol, poly (meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;
flame retardants; and/or
water scavengers.

In another embodiment of the invention, the binder mixture or coating composition of the invention may also comprise other pigments and/or fillers and may serve for the production of pigmented topcoats. The pigments and/or fillers employed for this purpose are known to the skilled worker.

The coatings of the invention that are produced from the coating compositions of the invention adhere outstandingly even to already cured electrocoats, surfacer coats, basecoats or customary and known clearcoats, and are outstandingly suitable, as well as for use in automotive OEM (production-line) finishing, for automotive refinish and/or for the coating of components for installation in or on automobiles, or for the modular scratchproofing of automobile bodies that have already been finished.

The coating compositions of the invention may be applied by any of the customary application methods, such as spraying, knifecoating, spreading, pouring, dipping, impregnating, trickling or rolling, for example. At application, the substrate to be coated may itself be at rest, with the application device or installation being moved. Alternatively the substrate to be coated, more particularly a coil, may be moving, with the application equipment being at rest relative to the substrate or being moved appropriately.

It is preferred to employ spray application methods, such as, for example, compressed air spraying, airless spraying, high-speed rotation, electrostatic spray application (ESTA), alone or in conjunction with hot spray application such as hot air spraying, for example.

The curing of the applied coating compositions of the invention may take place after a certain rest time. The rest time is used, for example, for the leveling and for the devolatilization of the coating films, or for the evaporation of volatile constituents such as solvents. The rest time may be assisted and/or shortened through the application of elevated temperatures and/or through a reduced atmospheric humidity, provided this does not entail any damage or change to the coating films, such as premature complete crosslinking, for instance.

The thermal curing of the coating compositions has no peculiarities of method but instead takes place in accordance with the customary and known methods such as heating in a forced-air oven or irradiation using IR lamps. This thermal curing may also take place in stages. Another preferred curing method is that of curing with near infrared (NIR radiation).

The thermal curing takes place advantageously at a temperature of 30 to 200° C., more preferably 40 to 190° C., and more particularly 50 to 180° C., for a time of 1 minute up to 10 hours, more preferably 2 minutes up to 5 hours, and more particularly 3 minutes to 3 hours; at the temperatures employed for automotive refinish and for the coating of plastics parts, which preferably lie between 30 and 90° C., it is also possible for longer curing times to be employed.

The coating compositions of the invention feature high solids content and provide new cured coatings, more particularly coating systems, especially clearcoat systems, moldings, especially optical moldings, and self-supporting sheets that are highly scratch-resistant, even after long-term exposure. At the same time, the coatings obtained in accordance with the invention also have a good intercoat adhesion and a very good overall appearance. Finally, the coatings and coating systems of the invention, especially the clearcoat systems, can be produced even at film thicknesses >40 μm without stress cracks occurring.

The coating compositions of the invention are therefore outstandingly suitable as decorative, protective and/or effect-imparting, highly scratch-resistant coatings and coating systems on bodywork of means of transport (more particularly motor vehicles, such as motorcycles, buses, trucks or automobiles) or of parts thereof; of buildings, in the interior and exterior; of furniture, windows, and doors; of plastics moldings, more particularly CDs and windows; of small industrial parts, of coils, containers, and packaging; of white goods; of films; of optical, electrical, and mechanical components; and also of hollow glassware and articles of everyday use.

More particularly the coating compositions and coating systems of the invention, especially the clearcoats, are employed in the technologically and esthetically particularly demanding field of automotive OEM finishing and for the coating of plastics parts for installation in or on automobile bodies, particularly for top-class automobile bodies, such as, for example, for the production of roofs, tailgates, hoods, fenders, bumpers, spoilers, sills, protective strips, side trim, and so on, and also for automotive refinish.

The plastics parts are composed typically of ASA, polycarbonates, blends of ASA and polycarbonates, polypropylene, polymethyl methacrylates or impact-modified polymethyl methacrylates, more particularly of blends of ASA and polycarbonates, used preferably with a polycarbonate fraction >40%, more particularly >50%.

By ASA is meant, generally, impact-modified styrene/acrylonitrile polymers where graft copolymers of vinylaromatic compounds, especially styrene, and of vinyl cyanides, especially acrylonitrile, on polyalkyl acrylate rubbers are present in a copolymer matrix comprising, in particular, styrene and acrylonitrile.

With particular preference the coating compositions of the invention are employed in multistage coating processes, more particularly in processes in which an optionally precoated substrate is coated first with a pigmented basecoat, after which a coat with the coating composition of the invention is applied. The invention accordingly also provides multicoat color and/or effect paint systems comprising at least one pigmented basecoat and at least one clearcoat disposed thereon, wherein the clearcoat has been produced from the coating composition of the invention.

Not only water-thinnable basecoat materials but also basecoat materials based on organic solvents can be used. Suitable basecoat materials are described, for example, in EP-A-0 692 007 and in the documents listed therein at column 3 lines 50ff. Preferably the applied basecoat material is first dried, which means that the basecoat film, in an evaporation phase, has at least some of the organic solvent and/or water removed from it. Drying takes place preferably at temperatures from room temperature to 80° C. After the drying, the coating composition of the invention is applied. The two-coat system is subsequently baked preferably under conditions which are employed in the context of automotive OEM finishing, at temperatures of 30 to 200° C., more preferably 40 to 190° C., and more particularly 50 to 180° C., for a time of 1 minute up to 10 hours, more preferably 2 minutes up to 5 hours, and more particularly 3 minutes to 3 hours; at the temperatures employed for automotive refinish, which preferably lie between 30 and 90° C., longer curing times may also be employed.

In another preferred embodiment of the invention, the coating composition of the invention is used as a transparent clearcoat material for coating plastics substrates, more particularly plastics parts for installation in or on a vehicle. These parts are preferably likewise coated in a multistage coating method, in which an optionally precoated substrate or a substrate pretreated for improved adhesion of the subsequent coats (for example, by flame, corona or plasma treatment of the substrate) is first coated with a pigmented basecoat, after which a layer with the coating composition of the invention is applied.

Finally, the coating composition of the invention is used as a transparent clearcoat material for coating transparent plastics substrates. In this case the coating compositions comprise UV absorbers which in terms of their quantity and type are designed for the effective UV protection of the plastics substrate.

EXAMPLES

Preparation of a poly(meth)acrylate resin with hydroxyl groups (A1)

A double-walled 4 l stainless steel tank which can be heated by means of an oil circulation thermostat and is equipped with thermometer, anchor stirrer, 2 dropping funnels, and reflux condenser is charged with solvent for the polymerization. One of the dropping funnels is charged with the monomer mixture, the second dropping funnel with the initiator solution, comprising a suitable initiator (generally a peroxide). The initial charge is heated to a polymerization temperature of 140° C. When the polymerization temperature is reached, first of all the initiator feed is commenced. 15 minutes after the start of the initiator feed, the monomer feed (duration: 240 minutes) is commenced. The initiator feed is set such that it continues for 30 minutes after the end of the monomer feed. After the end of the initiator feed, the mixture is stirred at 140° C. for a further 2 hours and then cooled to room temperature. The reaction mixture is subsequently adjusted with solvent to the solids content specified in table 2.

TABLE 1

Composition of the polymethacrylate (A1) in parts by weight

| Component | Part(s) by weight |
|---|---|
| Styrene | 8.0 |
| n-Butyl methacrylate | 8.0 |
| Acrylic acid | 0.6 |
| 4-Hydroxybutyl acrylate | 12.0 |
| 2-Hydroxyethyl acrylate | 12.0 |
| n-Butyl acrylate | 19.0 |

TABLE 2

Characteristics of the polymethacrylate (A1) (acid number and viscosity determined experimentally, OH number and Tg calculated theoretically)

| | |
|---|---|
| Solids 1 h 150° C. | 65% |
| Acid No. (measured) [mg KOH/g] | 8-12 |
| OH number calculated [mg KOH/g] | 175 |
| Tg (FOX) [° C.] | −27 |
| Viscosity [mPa · s] [1] | 2200 |

[1] determined at room temperature to DIN53229 with a Brookfield cone/plate viscometer, cone 3

Preparation of a Fully Silanized Polyisocyanurate (B1-1) (HDI with 20 mol % of Monosilane Structural Units II) and 80 mol % of Bissilane Structural Units III): Degree of Conversion c=100 mol %)

A steel reactor equipped with a reflux condenser and a thermometer is charged with 31 parts of trimerized hexamethylene diisocyanate (HDI) containing isocyanurate groups (Desmodur N3600 from Bayer), 17 parts of butyl acetate, and 3 parts of triethyl orthoformate. From a dropping funnel, a mixture of 37 parts of bis[3-(trimethoxysilyl)propyl]amine (Dynasylan 1124, Evonik, Rheinfelden) and 12 parts of trimethoxysilylpropyl-n-butylamine (Dynasylan 1189, Evonik, Rheinfelden) is then added dropwise under nitrogen blanketing and with stirring. A slight rise in temperature to around 40° C. is observed. After 2-hour stirring, the NCO value is determined by titrimetry. nonvolatile fraction (1 h, 150° C.): 80%, NCO content: 0% (solution).

Preparation of a Solution of a Uretdione-Group-Containing Isocyanate (B2)

200 parts by weight of a commercial dimerized polyisocyanate containing uretdione groups and based on hexamethylene diisocyanate (Desmodur® N3400 from Bayer) and 50 parts of butyl acetate are mixed with one another by stirring to form a solution having a solids content of 80.0% by weight.

Preparation of a Partially Silanized Polyisocyanurate (B1-2) Based on HDI-Based Isocyanurate (10 Mol % of Monosilane Structures IIa and 90 Mol % of Bissilane Structures IIIa: Degree of Conversion of the Isocyanate Groups c=40 mol %)

A steel reactor equipped with a reflux condenser and a thermometer is charged with 57.6 parts of trimerized hexamethylene diisocyanate (HDI) (Desmodur N3600 from Bayer), 14.8 parts of butyl acetate, and 2.8 parts of triethyl orthoformate. From a dropping funnel, a mixture of 39.4 parts of bis[3-(trimethoxysilyl)-propyl]amine (Dynasylan 1124, Evonik, Rheinfelden) and 3.0 parts of trimethoxysilylpropyl-N-butylamine (Dynasylan 1189, Evonik, Rheinfelden) is then added dropwise under nitrogen blanketing and with stirring. A slight rise in temperature to around 40° C. is observed. After 2-hour stirring, the NCO value is determined by titrimetry: NCO content: 6.6% (solution); nonvolatile fraction (1 h, 150° C.): 85%.

Mixing the amounts of silanized polyisocyanurate (B1-1) or (B1-2) and of the uretdione-group-containing isocyanate (B2) as indicated in table 3 produces the curing agent mixtures H1 to H3, and also HC1, that are set out in table 3.

TABLE 3

Composition of the curing agent mixtures H1 to H3 and HC1 in parts by weight, plus solids content, isocyanate content, and viscosity

| Curing agent mixture | Uretdione B2 | Isocyanurate B1-1 | Isocyanurate B1-2 | B2:B1 in % by weight | Isocyanate content of the mixture [%] | Solids of the mixture [%] | Viscosity of the mixture [mPa·s] |
|---|---|---|---|---|---|---|---|
| H1 | 75 | 25 | — | 75:25 | 13.2 | 80 | 55 |
| H2 | 50 | 50 | — | 50:50 | 8.8 | 80 | 104 |
| H3 | 25 | 75 | — | 25:75 | 4.4 | 80 | 246 |
| HC1 | — | — | 100 | — | 6.6 | 85 | — |

Calculation of the Proportions of the Uretdione-Group-Containing Compound B2 to the Silane-Group-Containing Compound B1 in Equivalents for the Curing Agent Mixtures H1 to H3 and HC1

Calculation of the equivalent weight of Desmodur® N3400 as per technical data sheet: (100*42 g)/21.8=193 g
Calculation of the equivalent weight of Desmodur® N3600 as per technical data sheet: (100*42 g)/23=183 g
Calculated equivalent weight of bis[3-(trimethoxy-silyl)propyl]amine: 341 g
Calculated equivalent weight of trimethoxysilylpropyl-N-butylamine: 234 g Calculation of the Equivalent Weight for the Uretdione-Group-Containing Compound B2

Degree of conversion c' in B2 to silane units: 0 mol %
Fraction as'2 in B2 of the isocyanate groups reacted with monosilane:

(amount of monosilane in mol %)/[total fraction (monosilane+bissilane)=100 mol %]=0

Fraction as'3 in B2 of the isocyanate groups reacted with bissilane:

(amount of bissilane in mol %)/[total fraction (monosilane+bissilane)=100 mol %]=0

Equivalent weight for the uretdione-group-containing compound B2:

[193 g(equivalent weight of Desmodur® N3400)]+0*[(0*234 g)+(0*341 g)]=193 g

Calculation of the Equivalent Weight for the Silane-Group-Containing Compound B1-1

Degree of conversion c in B1-1 to silane units: 100 mol %/100 mol %=1.0
Fraction as2 in B1-1 of the isocyanate groups reacted with monosilane:

(amount of monosilane in mol %)/[total fraction (monosilane+bissilane)=100 mol %]=20 mol %/100 mol %=0.2

Fraction as3 in B1-1 of the isocyanate groups reacted with bissilane:

(amount of bissilane in mol %)/[total fraction (monosilane+bissilane)=100 mol %]=80 mol %/100 mol %=0.8

Equivalent weight for the silane-group-containing compound B1-1:

[183 g(equivalent weight of Desmodur® N3600)]+ 1.0*[(0.2*234 g)+(0.8*341 g)]=183 g+(1.0)*[46.8 g+272.8 g]=502.6 g Calculation of the Equivalent Weight for the Silane-Group-Containing Compound B1-2

Degree of conversion c in B1-2 to silane units: 40 mol %/100 mol %=0.4
Fraction as2 in B1-2 of the isocyanate groups reacted with monosilane:

(amount of monosilane in mol %)/[total fraction (monosilane+bissilane)=100 mol %]=10 mol %/100 mol %=0.1

Fraction as3 in B1-2 of the isocyanate groups reacted with bissilane:

(amount of bissilane in mol %)/[total fraction (monosilane+bissilane)=100 mol %]=90 mol %/100 mol %=0.9

Equivalent weight for isocyanurate B1-2:

[183 g(equivalent weight of Desmodur® N3600)]+ 0.4*[(0.1*234 g)+(0.9*341 g)]=183 g+(0.4)*[23.4 g+306.9 g]=315.1 g Calculation of the proportion of the curing agent mixture H1 (75 parts by weight of compound B2 and 25 parts by weight of compounds B1-1) in equivalents of B2 to equivalents of B1-1: 7.8:1.0

$$\frac{\text{Equivalents of } B2}{\text{Equivalents of } B1\text{-}1} = \frac{75/193}{25/502.6} = \frac{75*502.6}{25*193} = \frac{7.8}{1.0}$$

Calculation of the proportion of the curing agent mixture H2 (50 parts by weight of compound B2 and 50 parts by weight of compound B1-1) in equivalents of B2 to equivalents of B1-1: 2.6:1.0

$$\frac{\text{Equivalents of } B2}{\text{Equivalents of } B1\text{-}1} = \frac{50/193}{50/502.6} = \frac{50*502.6}{50*193} = \frac{2.6}{1.0}$$

Calculation of the proportion of the curing agent mixture H3 (25 parts by weight of compound B2 and 75 parts by weight of compound B1-1) in equivalents of B2 to equivalents of B1-1: 0.87:1.0

$$\frac{\text{Equivalents of } B2}{\text{Equivalents of } B1\text{-}1} = \frac{25/193}{75/502.6} = \frac{25*502.6}{75*193} = \frac{0.87}{1.0}$$

Calculation of the proportion of the curing agent mixture HC1 (100 parts by weight of compound B1-2) in equivalents of B2 to equivalents of B1-2:0

$$\frac{\text{Equivalents of } B2}{\text{Equivalents of } B1\text{-}2} = \frac{0/193}{100/315} = \frac{0*315}{100*193} = \frac{0}{1.0}$$

Formulation of the Inventive Coating Compositions B1 to B3 and the Coating Compositions CB1 and of the Corresponding Coatings of Examples 1 to 3 and of Comparative Example C1

In the order indicated (beginning from the top), the constituents indicated in table 4 are combined intimately with one another in an appropriate vessel and immediately thereafter are coated onto a metal mirror plate coated with black basecoat (basecoat drying: 30 minutes at 80° C., 10-minute flash-off time). Thereafter the sheets are dried in an oven at 60° C. for 30 minutes. The coatings obtained are stored at room temperature for 24 hours and subjected to measurement with a Wave-Scan® from BYK-Gardner. The test results are set out in table 5.

TABLE 4

Composition of the inventive coating compositions B1 to B3 and of comparative example CB1, in each case based on the hydroxyl-containing polymethacrylate (A1)

|  | Example B1 | Example B2 | Example B3 | Comparative Example CB1 |
|---|---|---|---|---|
| Polyacrylate (A1) | 95 | 95 | 95 | 80 |
| Byk 333 [1] | 0.4 | 0.4 | 0.4 | 0.4 |
| Tinuvin ® 384 [2] | 1.0 | 1.0 | 1.0 | 1.0 |
| Tinuvin ® 292 [3] | 1.0 | 1.0 | 1.0 | 1.0 |
| Nacure 4167 ® [4] | 2.6 | 2.6 | 2.6 | 2.4 |
| Curing agent H1 | 60 |  |  |  |
| Curing agent H2 |  | 90 |  |  |
| Curing agent H3 |  |  | 175 |  |
| Curing agent HC1 |  |  |  | 100 |
| Nonvolatile fraction (1 h, 150° C.) | 70.6% | 72.1% | 74.5% | 70.0% |
| Butyl acetate | 1 | 5 | 8 | — |
| Nonvolatile fraction (1 h, 150° C.) | 70% | 70% | 70% | 70% |

[1] Byk 333 = commercial, surface-active additive from Byk Chemie
[2] Tinuvin ® 384 = commercial light stabilizer based on a benzotriazole, from Ciba
[3] Tinuvin ® 292 = commercial light stabilizer based on a sterically hindered amine, from Ciba
[4] Nacure ® 4167 = commercial catalyst based on amine-blocked phosphoric acid partial ester, from King Industries, nonvolatile fraction 25%

TABLE 5

Test results for the coatings of examples B1 to B3 and of comparative example CB1

|  | Film thickness [μm] | Short Wave | Long Wave |
|---|---|---|---|
| Basecoat sheet 1 without clearcoat | 15 | 8.1 | 2.2 |
| Clearcoat B1 on basecoat sheet 1 | 40 | 5.1 | 1.1 |
| Basecoat sheet 2 without clearcoat | 15 | 8.0 | 2.2 |
| Clearcoat B2 on basecoat sheet 2 | 40 | 3.9 | 1.2 |
| Basecoat sheet 3 without clearcoat | 15 | 8.0 | 2.4 |
| Clearcoat B3 on basecoat sheet 3 | 40 | 4.3 | 1.8 |
| Basecoat sheet 4 without clearcoat | 15 | 8.1 | 2.6 |
| Clearcoat CB1 on basecoat sheet 4 | 41 | 10.3 | 14.6 |

All of the coatings are dry to touch after the drying described (30 minutes at 60° C.). Any incidence of tacky films under deviant optimal laboratory conditions can be remedied easily by slightly increased quantities of catalyst and/or more effective catalysts.

Summary of the Test Results

The comparison both of the long-wave values (LW) and of the short-wave values (SW) in table 5 shows that inventive examples 1 to 3 exhibit substantially better longwave values (LW) and shortwave values (SW) than comparative example C1.

With all of the inventive curing agent mixtures H1 to H3, therefore, it is possible to achieve very good flow at the target film thickness of 40 μm, even at high solids content. Furthermore, all of the inventive coating compositions ensure rapid curing even under the conditions of refinish, i.e., all of the coatings are touch-dry after drying at 60° C. for 30 minutes. The rapid curing is controlled in particular via the fraction of the silane functions introduced by way of the isocyanurate B1, while the flow and the solids content of the coating compositions are set via the fraction of the uretdione-group-containing isocyanate B2.

What is claimed is:

1. A coating composition based on aprotic solvents and comprising:
   at least one oligomeric and/or polymeric, hydroxyl-containing compound (A);
   at least one compound (B1) having at least one silane group of the formula (I)

   —X—Si—R''$_x$G$_{3-x}$  (I)

wherein
   G=alkoxy group OR', with R'=hydrogen, alkyl or cycloalkyl, it being possible for a carbon chain in the alkyl or cycloalkyl to be interrupted by nonadjacent oxygen, sulfur or NRa groups, with
   Ra=alkyl, cycloalkyl, aryl, or aralkyl,
   X=organic radical,
   R''=alkyl, cycloalkyl, aryl, or aralkyl, it being possible for a carbon chain in the alkyl, cycloalkyl, aryl, or aralkyl to be interrupted by nonadjacent oxygen, sulfur or NRa groups, with Ra=alkyl, cycloalkyl, aryl, or aralkyl,
   x=0 to 2;
   and
   at least one compound (B2) which is different from the at least one compound (B1) and comprises at least 2 isocyanate groups per molecule, wherein
   (i) the at least one compound (B2) comprises uretdione groups, and
   (ii) the at least one compound (B2) has been prepared by isocyanate oligomerization from a linear aliphatic diisocyanate (DI).

2. The coating composition of claim 1, wherein the at least one compound (B2) is prepared from a linear aliphatic diisocyantate (DI) having 3 to 12 C atoms.

3. The coating composition of claim 1, wherein the at least one compound (B2) has a uretdione group content >50 mol %, based on the entirety of the at least one compound (B2).

4. The coating composition of claim 1, wherein the silane-group-containing compound (B1) comprises as least one member selected from the group consisting of isocyanurate groups, allophanate groups, isocyanate groups, and mixtures of two or more of the foregoing.

5. The coating composition of claim 1, wherein the compound (B1) comprises
   between 0 and 100 mol %, based on the entirety of the structural units (II) and (III), of at least one structural unit of the formula (II)

   —NR—(X—SiR''$_x$)(OR')$_{3-x}$)  (II)

and
   between 0 and 100 mol %, based on the entirety of the structural untis units (II) and (III), of at least one structural unit of the formula (III)

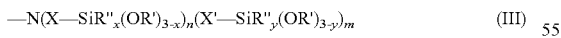
   —N(X—SiR''$_x$(OR')$_{3-x}$)$_n$(X'—SiR''$_y$(OR')$_{3-y}$)$_m$  (III)

wherein
   R=hydrogen, alkyl, cycloalkyl, aryl or aralkyl, it being possible for a carbon chain of the alkyl, cycloalkyl, aryl, or aralkyl to be interrupted by nonadjacent oxygen, sulfur or NRa groups, with Ra=alkyl, cycloalkyl, aryl or aralkyl,
   R'=hydrogen, alkyl or cycloalkyl, it being possible for a carbon chain of the alkyl or cycloalkyl to be interrupted by nonadjacent oxygen, sulfur or NRa groups, with Ra=alkyl, cycloalkyl, aryl, or aralkyl,
   X, X'=linear and/or branched alkylene or cycloalkylene radical having 1 to 20 carbon atoms,
   R''=alkyl, cycloalkyl, aryl, or aralkyl, it being possible for a carbon chain of the alkyl, cycloalkyl, aryl, or aralkyl to be interrupted by nonadjacent oxygen, sulfur or NRa groups, with Ra=alkyl, cycloalkyl, aryl, or aralkyl,
   n=0 to 2,
   m=0 to 2,
   m+n=2, and
   x, y=0 to 2.

6. The coating composition of claim 5, wherein less than 5 mol % of the isocyanate groups in the uretdione-group-containing compound (B2) have undergone reaction to form structural units (I), (II), and/or (III).

7. The coating composition of claim 1, wherein the at least one compound (B1) is the reaction product of (a)bis(3-propyltrimethylsilyl)amine and optionally N-(3-(trimethoxysilyl)propylbutylamine with a member selected from the group consisting of (β)1,6-hexmethylene diisocyanate, isophorone diisocyanate, 4,4'-methylenedicyclohexyl diisocyanate, the biuret dimers of the aforementioned diisocyanates, the isocyanurate trimers of the aforementioned diisocyanates, and mixtures of two or more of the foregoing.

8. The coating composition of claim 1, wherein the ratio in equivalents of the uretdione-group-containing compound (B2) to equivalents of the silane-group-containing compound (B1) is between 0.5:1.0 and 50.0:1.0.

9. The coating composition of claim 1, wherein the hydroxyl-containing compound (A) is selected from the group consisting of polyacrylate polyols, polymethacrylate polyols, polyester polyols, polyurethane polyols, polysiloxane polyols, and mixtures of two or more of the foregoing.

10. The coating composition of claim 1, wherein compound (A) comprises lactone-modified, hydroxyl-containing, oligomeric and/or polymeric compounds.

11. A multistage coating method comprising applying a pigmented basecoat film to an optionally precoated substrate and thereafter applying a layer of the coating composition of claim 1.

12. The multistage coating method of claim 11, wherein application of the pigmented basecoat film is followed by drying of the applied basecoat initially at temperatures from room temperature to 80° C., and application of the coating composition is followed by curing at temperatures from 30 to 90° C. for a time of 1 minute to 10 hours.

13. A method of clearcoating a substrate, comprising applying the coating composition of claim 1 as a clearcoat to a substrate selected from the group consisting of automotive refinish substrates, automotive component substrate, plastic substrates, and mixtures of two or more of the foregoing.

14. The method of claim 13, wherein the substrate is a plastic substrate.

15. A coating composition based on aprotic solvents and comprising:
   at least one oligomeric and/or polymeric, hydroxyl-containing compound (A);
   at least one compound (B1) having at least one silane group of the formula (I)

   —X—Si—R''$_x$G$_{3-x}$  (I)

wherein
   G=identical or different hydrolyzable groups,
   X=organic radical,
   R''=alkyl, cycloalkyl, aryl, or aralkyl, it being possible for a carbon chain in the alkyl, cycloalkyl, aryl, or aralkyl to be interrupted by nonadjacent oxygen, sulfur or NRa groups, with Ra=alkyl, cycloalkyl, aryl, or aralkyl,
   x=0 to 2;

and at least one compound (B2) which is different from the compound (B1) and comprises at least 2 isocyanate groups per molecule, wherein (i) the compound (B2) comprises uretdione groups, and (ii) the compound (B2) has been prepared by isocyanate oligomerization from a linear aliphatic diisocyanate (DI).

* * * * *